(12) United States Patent
Sun et al.

(10) Patent No.: US 12,730,269 B2
(45) Date of Patent: Sep. 8, 2026

(54) OPTICAL FERRULES

(71) Applicant: 3M INNOVATIVE PROPERTIES COMPANY, St. Paul, MN (US)

(72) Inventors: Xiaoguang Sun, Woodbury, MN (US); Michael A. Haase, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 320 days.

(21) Appl. No.: 18/279,268

(22) PCT Filed: Mar. 14, 2022

(86) PCT No.: PCT/IB2022/052264
§ 371 (c)(1),
(2) Date: Aug. 29, 2023

(87) PCT Pub. No.: WO2022/195442
PCT Pub. Date: Sep. 22, 2022

(65) Prior Publication Data

US 2024/0142726 A1 May 2, 2024

Related U.S. Application Data

(60) Provisional application No. 63/200,603, filed on Mar. 17, 2021.

(51) Int. Cl.
*G02B 6/42* (2006.01)

(52) U.S. Cl.
CPC ......... *G02B 6/4214* (2013.01); *G02B 6/4228* (2013.01); *G02B 6/4257* (2013.01)

(58) Field of Classification Search
CPC .. G02B 6/4214; G02B 6/4228; G02B 6/4257; G02B 6/4256; G02B 1/11; G02B 1/111;
(Continued)

(56) References Cited

U.S. PATENT DOCUMENTS

| | | | |
|---|---|---|---|
| 6,645,608 B2 | 11/2003 | Schulz et al. | |
| 10,222,563 B2 * | 3/2019 | Haase | G02B 6/4204 |

(Continued)

FOREIGN PATENT DOCUMENTS

| | | |
|---|---|---|
| EP | 1307767 B1 | 12/2008 |

OTHER PUBLICATIONS

International Search Report for PCT International Application No. PCT/IB2022/052264, mailed on Jun. 17, 2022, 3 pages.

*Primary Examiner* — John Bedtelyon
(74) *Attorney, Agent, or Firm* — Jonathan L. Tolstedt

(57) ABSTRACT

An optical ferrule for transmitting and propagating light having a predetermined wavelength includes a polymeric ferrule body having a fiber alignment feature for receiving an optical fiber, a redirecting side for redirecting light, and an output side window for exiting light therethrough. A multilayer anti-reflection film is disposed on the output side window and includes at least two first layers including titanium oxide and at least two second layers including silicon dioxide. At least one of the two first layers is thinner than an optimum thickness that would minimize reflection at the predetermined wavelength. Heating the optical ferrule at a temperature of about 85 degrees centigrade for at least five hours results in no, or very little, damage to the multilayer anti-reflection film.

10 Claims, 6 Drawing Sheets

(58) Field of Classification Search
CPC ......... G02B 1/113; G02B 1/115; G02B 1/116; G02B 5/0294
See application file for complete search history.

(56) References Cited

U.S. PATENT DOCUMENTS

2012/0075705 A1 3/2012 Beinat et al.
2013/0177751 A1* 7/2013 Oh ......................... B05D 5/061 428/411.1
2015/0323748 A1 11/2015 Contag
2016/0320568 A1 11/2016 Haase et al.
2017/0307834 A1 10/2017 Mathai et al.

* cited by examiner

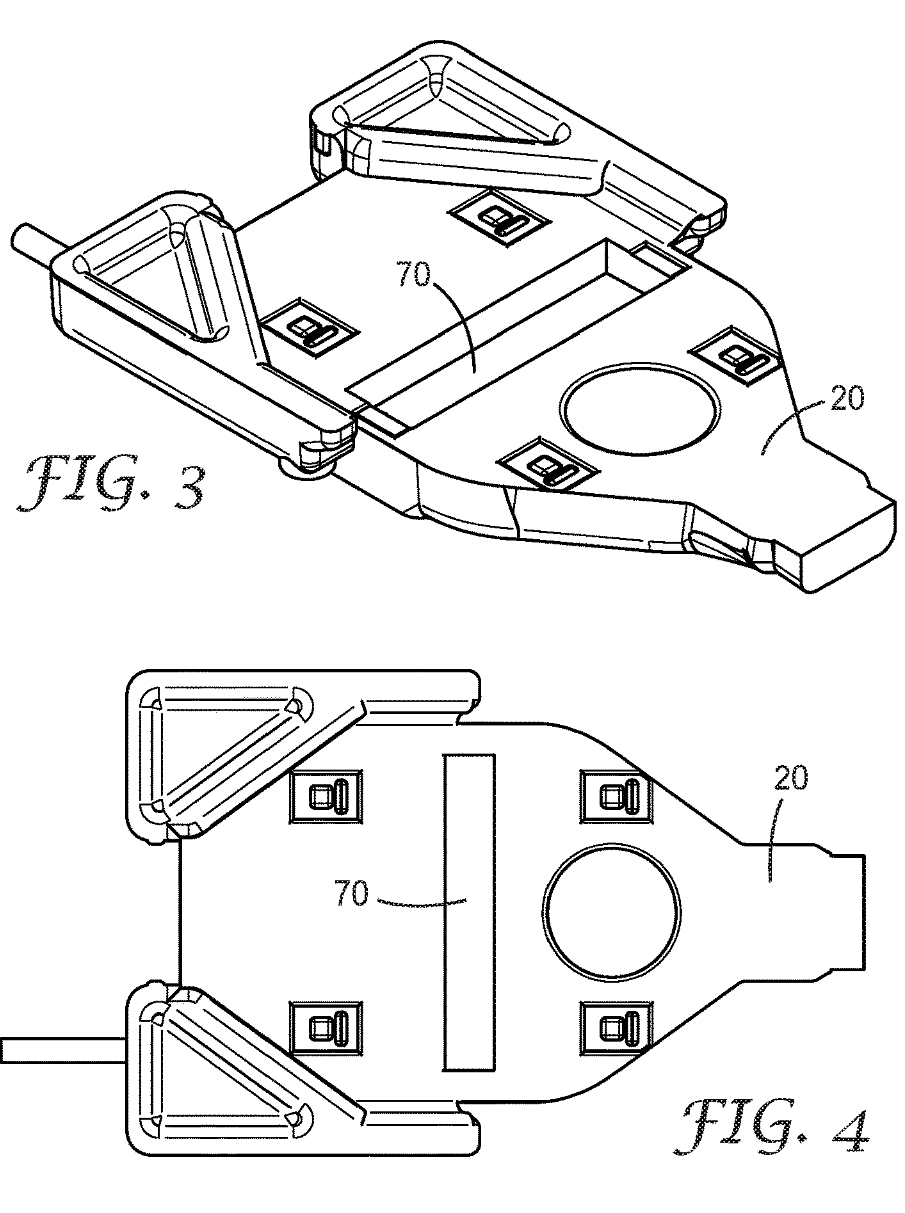
FIG. 3
FIG. 4
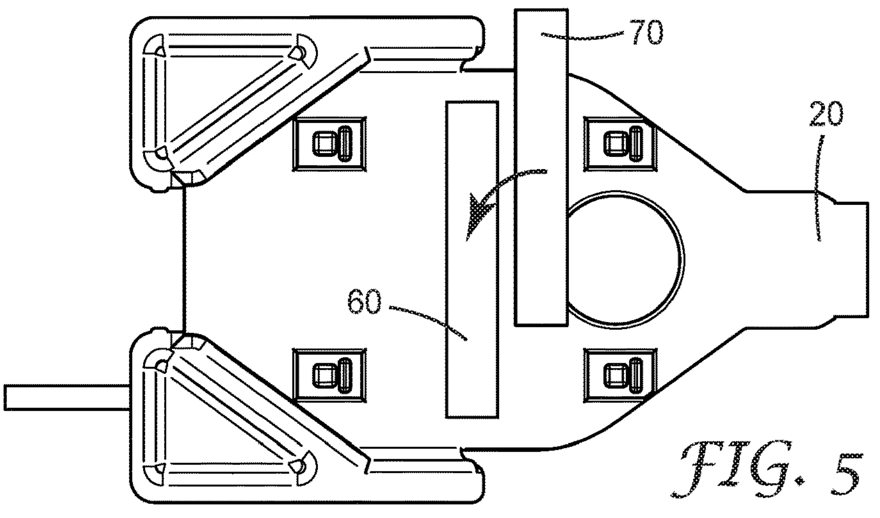
FIG. 5

OPTICAL FERRULES

CROSS REFERENCE TO RELATED APPLICATIONS

This application is a national stage filing under 35 U.S.C. 371 of PCT/IB2022/052264 filed, Mar. 14, 2022, which claims the benefit of U.S. Provisional Application No. 63/200,603, filed Mar. 17, 2021, the disclosures of which are incorporated by reference in their entireties herein.

TECHNICAL FIELD

This disclosure relates generally to optical coupling devices such as optical ferrules.

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output. For some applications, optical fibers may be coupled to other optical fibers and/or system components by an optical connector. Optical connectors, including expanded beam optical connectors, can include optical ferrules having elements for receiving and securing optical waveguides, elements for affecting light from the optical waveguides, and features for aligning the optical ferrule to a mating optical ferrule. The optical components used in fiber optics communications often contain numerous materials having distinct physical properties. In many applications, injection molded optical components based on thermoplastic polymers are chosen for obtaining weight reduction, cost savings and design flexibility.

SUMMARY

Various aspects and embodiments described herein relate to optical connectors and optical ferrules.

Some aspects of the disclosure relate to an optical ferrule configured to transmit and propagate therein light having a wavelength in a predetermined wavelength range extending from about 1250 nm to about 1650 nm. The optical ferrule includes a unitary polymeric ferrule body including one or more fiber alignment features for receiving one or more optical fibers, an input side, a redirecting side, and an output side window. A non-optimized multilayer anti-reflection film is disposed on the output side window and includes a plurality of alternating higher and lower index layers. In some embodiments, each higher index layer may include titanium oxide, and each lower index layer may include silicon dioxide. When an optical fiber is received by a fiber alignment feature in the one or more fiber alignment features, a central light ray emitted by the optical fiber at the predetermined wavelength enters the polymeric ferrule body through the input side, is redirected by the redirecting side, and exits the polymeric ferrule body through the output side window and the non-optimized multilayer anti-reflection film after being incident on the non-optimized multilayer anti-reflection film at a predetermined incident angle. At the predetermined incident angle and across the predetermined wavelength range, the non-optimized multilayer anti-reflection film has an average optical reflectance that is greater by at least about 20% than an average minimum reflectance achievable in an optimized multilayer anti-reflection film that has a same number of layers as the non-optimized multilayer anti-reflection film and includes titanium oxide and silicon dioxide.

Some aspects of the disclosure relate to a polymeric ferrule body including a fiber alignment feature for receiving an optical fiber, a redirecting side for redirecting light, and an output side window for exiting light therethrough. A multilayer anti-reflection film is disposed on the output side window and includes at least two first layers including titanium oxide and at least two second layers including silicon dioxide. The optical ferrule is configured to transmit and propagate therein light having a predetermined wavelength. At least one of the two first layers is thinner than an optimum thickness that would minimize reflection at the predetermined wavelength. Heating the optical ferrule at a temperature of about 85 degrees centigrade for at least five hours results in no, or very little, damage to the multilayer anti-reflection film.

Some other aspects of the disclosure relate to an optical ferrule including a polymeric ferrule body including a fiber alignment feature for receiving an optical fiber, a redirecting side for redirecting light, and an output side window for exiting light therethrough. A multilayer anti-reflection film is disposed on the output side window and includes at least first and second high index layers including titanium oxide and at least two low index layers including silicon dioxide. The first high index layer is disposed between the ferrule body and the second high index layer. An average thickness of the second high index layer is less than about 140 nm.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIG. 1 schematically shows an optical ferrule according to some aspects of the disclosure;

FIGS. 3-5 schematically show different views of an optical ferrule according to some aspects of the disclosure;

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Thermoplastic polymers, such as cyclo olefin polymer for instance, are used for high precision injection molding as they offer good optical properties such as high transparency, low haze and low birefringence. Single layer or multilayer antireflection (AR) coatings are often applied on the thermoplastic polymer to reduce the reflection loss at plastic-to-air interface. However, the AR coatings may cause thermal expansion mismatch between the AR coatings and the plastic substrates as well as intrinsic stresses in the AR coating layers. In some instances, AR coatings may generate undesirable cracks (also called crazing) during thermal soaking, which is a standard procedure during environmental testing. The embodiments disclosed herein address these and other challenges.

Some embodiments of the disclosure relate to optical ferrules including cracking-free multilayer antireflection coatings having higher and lower index layers disposed on a polymeric ferrule body. By controlling the thickness of the high index layers, the antireflection coating cracks can be prevented at both room temperature and elevated temperatures.

Figure 1:
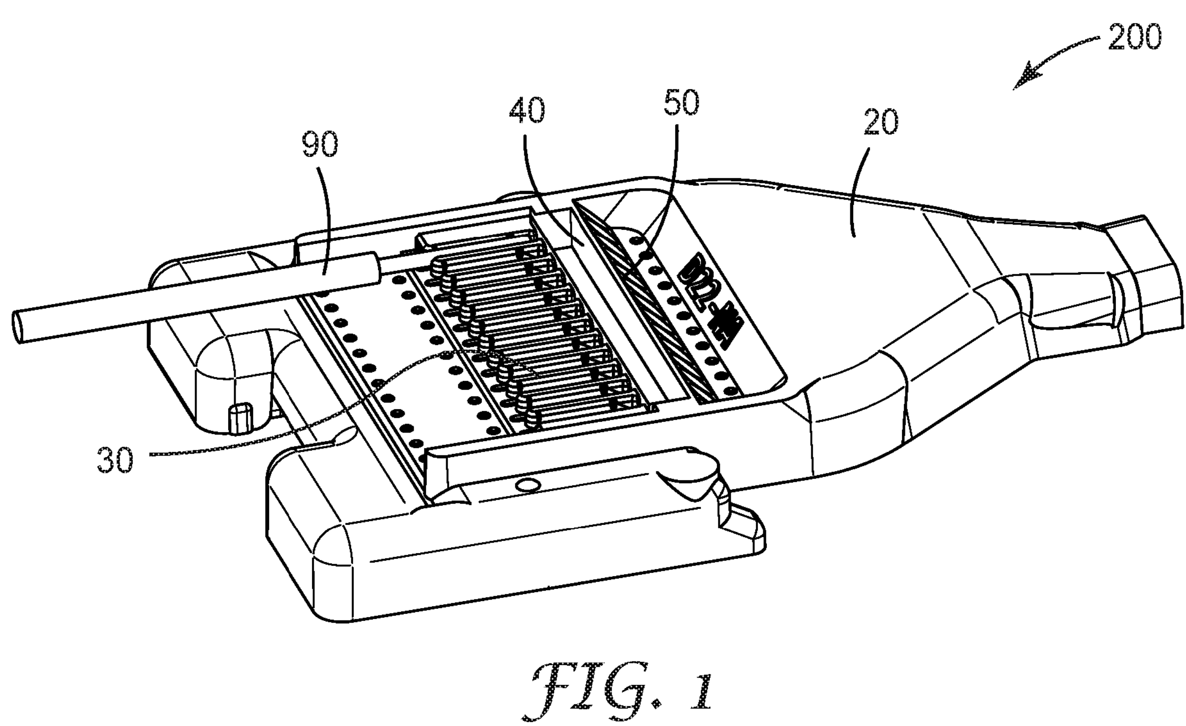
Figure 2:
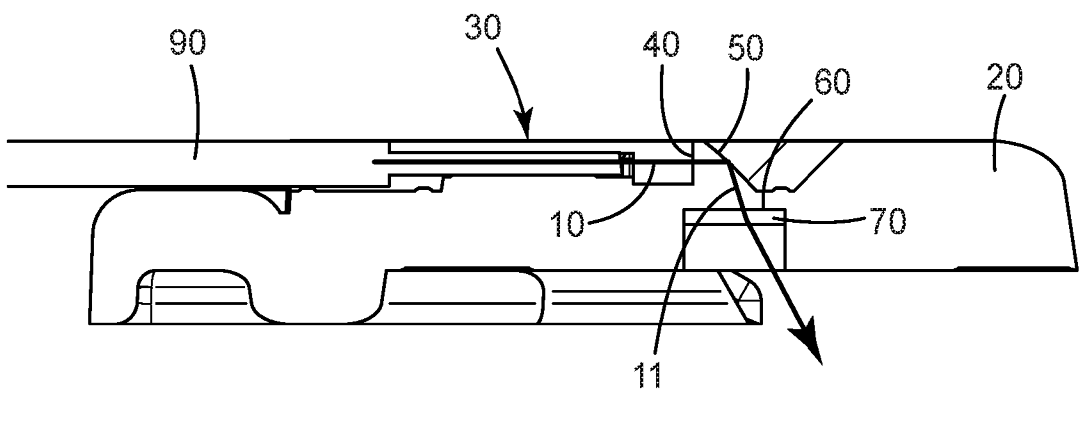
FIG. 2 schematically shows a cross-sectional view of the optical ferrule according to some aspects of the disclosure.

Some embodiments of an optical ferrule (200) are illustrated in FIGS. 1 and 2. The optical ferrule (200) may have a unitary construction (e.g., a construction including a first piece integrally formed on a second piece). In other aspects, the optical ferrule may be a ferrule that includes pieces formed separately and adhered or otherwise fastened together. The ferrule may be made from any suitable materials including polymers or ceramics. In some embodiments, the optical ferrule (200) may include a unitary polymeric ferrule body (20). The unitary polymeric ferrule body (20) may include a cyclic olefin polymer or copolymer or the like. The ferrule (200) may include one or more elements that guide or help guide the ferrule and a mating ferrule into alignment when the two ferrules are mated. In some aspects, the optical ferrule and/or the mating optical ferrule may be hermaphroditic.

Figure 7:
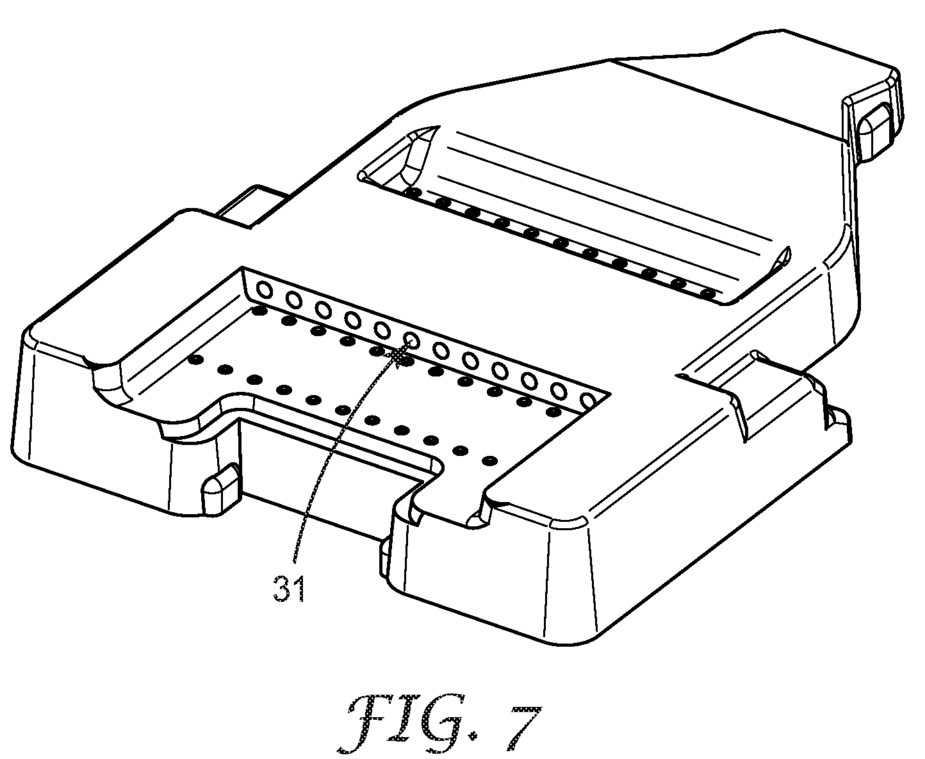
FIG. 7 schematically shows an optical ferrule including one or more fiber alignment features for receiving optical fibers according to some aspects of the disclosure.

In some embodiments, the unitary polymeric ferrule body (20) of the optical ferrule (200) may include a fiber alignment feature (30) for receiving an optical fiber (90). In some aspects, the optical ferrule (200) may include one or more fiber alignment features (30), substantially parallel to each other, for receiving and securing one or more optical fibers (90). Each optical fiber (90) may be received and secured in a different fiber alignment feature (30). At the point of attachment, the fiber buffer coating and protective jacket, if any, of the optical fiber (90) are stripped away to allow only the bare optical fibers to lie aligned with the fiber alignment feature (30). At least one of the one or more fiber alignment features (30), according to some embodiments, may include a fibre receiving groove, which can be u-shaped, v-shaped, or contain chamfer or tapered edges to ease insertion and/or reception of the optical fiber (90). In other optical ferrules (200), as best shown in FIG. 7, at least one of the one or more fiber alignment features may include a fiber receiving hole (31). The fiber receiving hole (31) may be a circular, square, diamond, or other cross-sectional shaped receptacle that can hold the optical fiber (90).

In some embodiments, the one or more optical fibers (90) may form an optical waveguide array of an optical cable. The term optical waveguide/fiber is used herein to refer to an optical element that propagates signal light. An optical waveguide may have at least one core with a cladding, wherein the core and cladding are configured to propagate light, e.g., by total internal reflection. An optical waveguide may be, for example, a single or multi-mode waveguide, a single core optical fiber, a multi-core optical fiber, a polymeric waveguide, or planar waveguides disposed on a substrate. A waveguide may have any suitable cross-sectional shape, e.g., circular, square, rectangular etc. The individual waveguides in the waveguide array may be optical fibers made of glass with a protective buffer coating. Multiple parallel waveguides of a waveguide array may be enclosed by a jacket.

Figure 9:
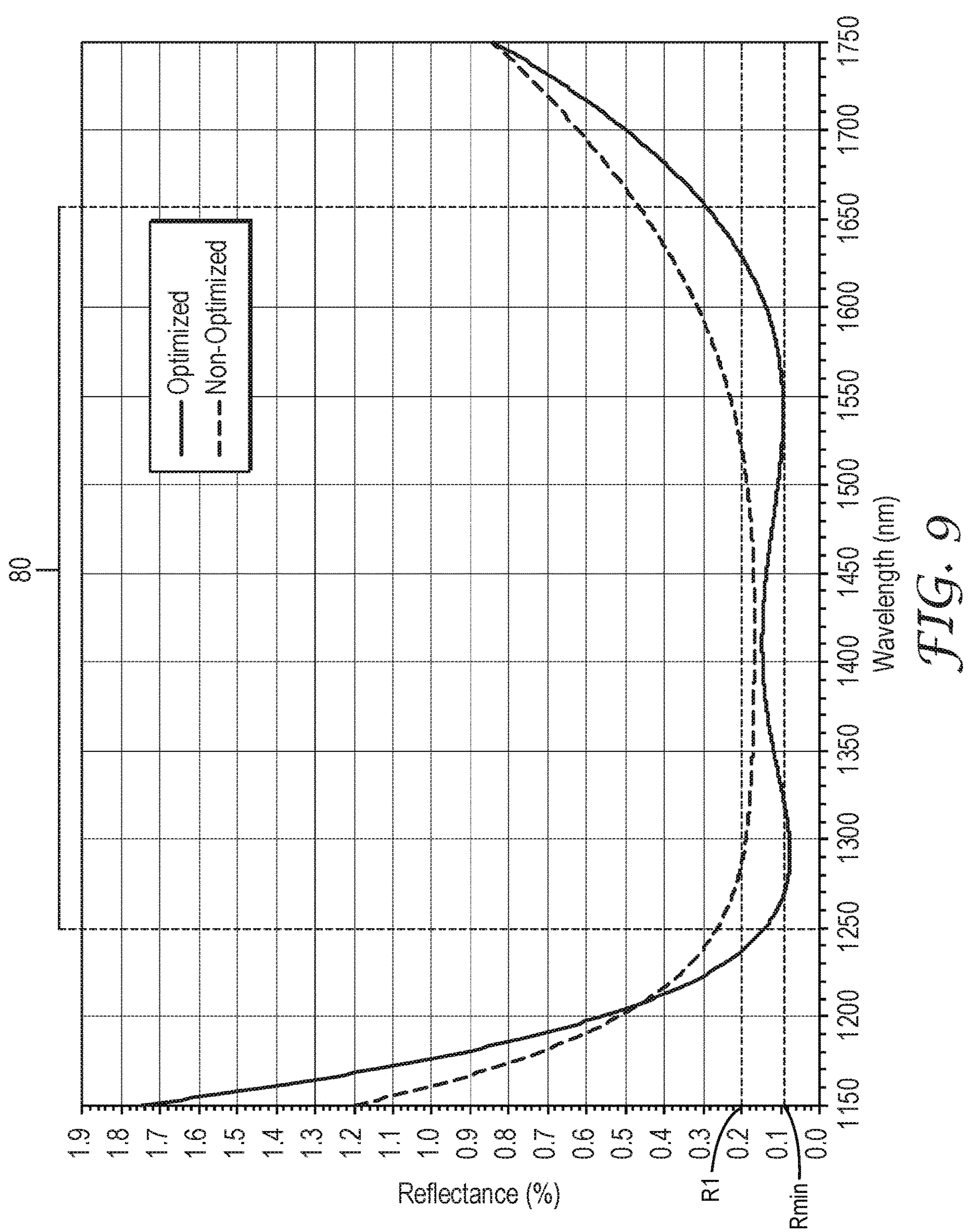
FIG. 9 graphically shows the average optical reflectance of non-optimized and optimized multilayer anti-reflection film.

The optical ferrule (200) can be configured to transmit and propagate therein light having a predetermined wavelength (4). In some cases, the optical ferrule (200) can be configured to transmit and propagate therein light having a wavelength in a predetermined wavelength range (80) extending from about 1250 nm to about 1650 nm as shown in FIG. 9.

As best shown in FIG. 2, a central light ray (10) from an optical waveguide (90) attached to the optical ferrule (200) may be received and transmitted by a light input side (40) of the unitary polymeric ferrule body (20). The polymeric ferrule body (20) may further include a redirecting side (50) for redirecting light and an output side window (60) for exiting light therethrough. In some aspects, the optical ferrule (200) may be so configured such that, when an optical fiber (90) is received by a fiber alignment feature (30) in the one or more fiber alignment features, the central light ray (10) emitted by the optical fiber (90) at the predetermined wavelength (4) enters the polymeric ferrule body (20) through the input side (40), is redirected (11) by the redirecting side (50), and exits (12) the polymeric ferrule body (20) through the output side window (60). In some aspects, the redirected central light ray (11) may exit the optical ferrule (200) through the output side window (60) of the optical ferrule (200) and may be configured to enter a mating optical ferrule (not shown).

In some embodiments, a multilayer anti-reflection film (70) may be disposed on the output side window (60) of the optical ferrule (200). FIGS. 3-5 show different bottom views of the polymeric ferrule body (20) including the multilayer anti-reflection film (70) disposed on the output side window (60). The multilayer anti-reflection film (70), in some cases, may be vacuum deposited on the output side window (60) by electron beam evaporation.

Figure 6:
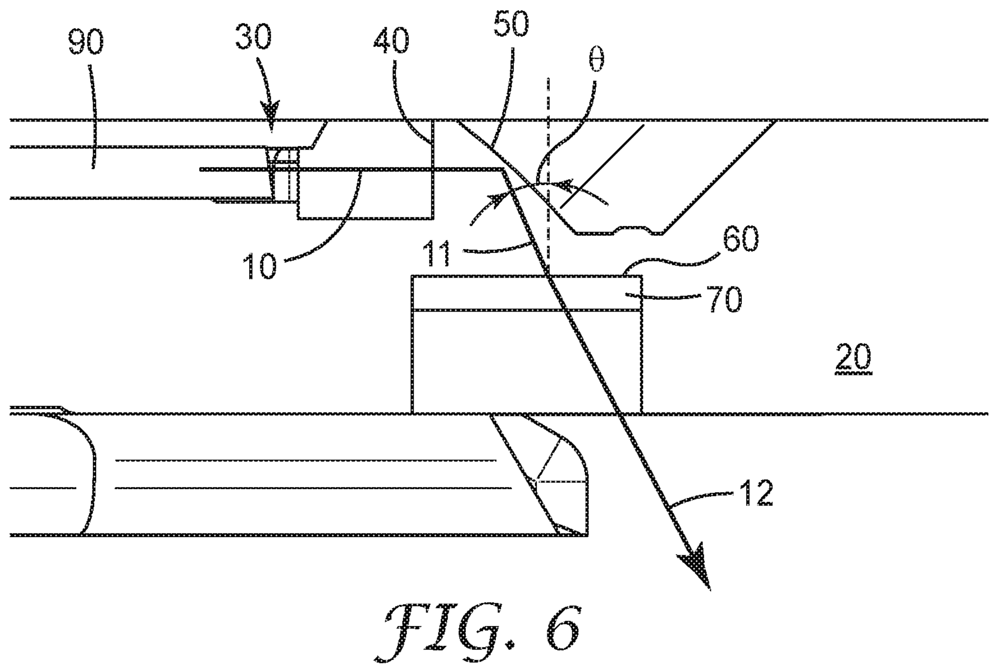
FIG. 6 schematically shows a cross-sectional view of the optical ferrule and propagation of a central light ray within the ferrule, according to some aspects of the disclosure.

In some embodiments, the multilayer anti-reflection film (70) may be a non-optimized multilayer anti-reflection film. In some embodiments, as best shown in FIG. 6, the redirected central light ray (11) exits the polymeric ferrule body (20) through the output side window (60) and the non-optimized multilayer anti-reflection film (70) after being incident on the non-optimized multilayer anti-reflection film (70) at a predetermined incident angle (0).

Figure 8:
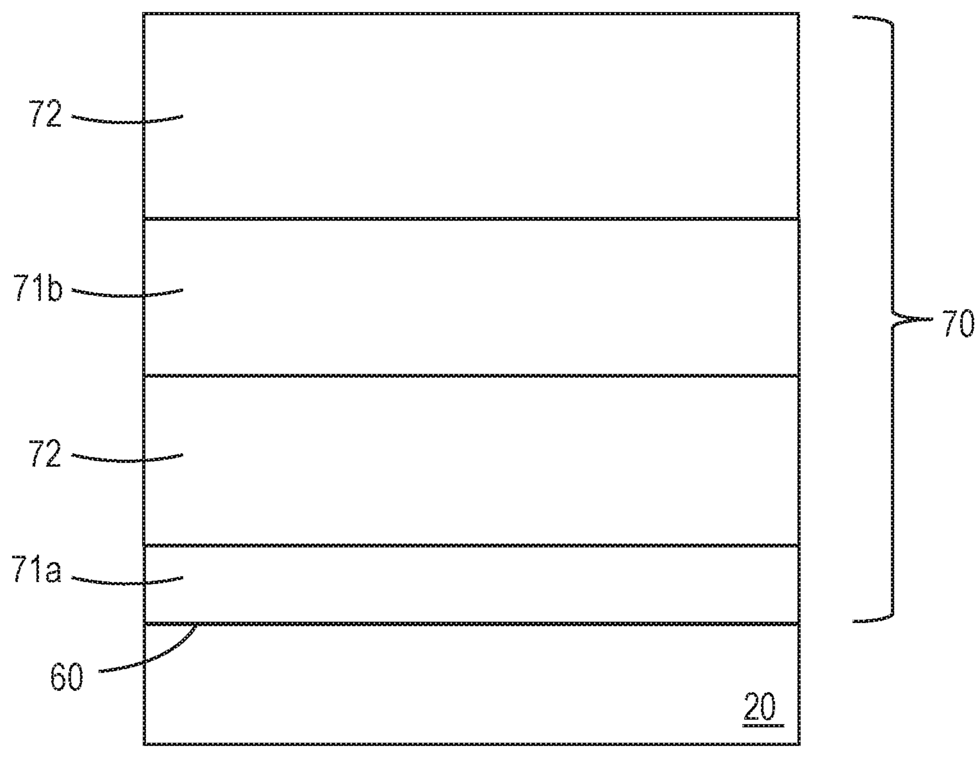
FIG. 8 schematically shows a non-optimized multilayer anti-reflection film according to some embodiments of the disclosure.

In some aspects, the non-optimized multilayer anti-reflection film (70) may include first (71*a*, 71*b*) and second (72) layers as shown in FIG. 8. In one or more embodiments, the first and second layers (71*a*, 71*b*; 72) of the non-optimized multilayer anti-reflection film (70) may be characterized as having different refractive indices from one other. In one embodiment, the first and second layers (71a, 71b; 72) of the non-optimized multilayer anti-reflection film (70) may include high and low index layers, for instance, a plurality of alternating higher (71a, 71b) and lower (72) index layers. In some aspects, each higher index layer may include titanium oxide and each lower index layer may include silicon dioxide. In some cases, the non-optimized multilayer anti-reflection film (70) may include first (71a) and second (71b) high index layers. The first high index layer (71a) may be disposed between the second high index layer (71b) and the ferrule body (20). In one embodiment, the non-optimized multilayer anti-reflection film (70) includes only two higher index layers (71a, 71b) and only two lower index layers (72).

In some cases, the multilayer anti-reflection film (70) may include at least two first layers (71a, 71b) including titanium oxide and at least two second layers (72) including silicon dioxide. In some aspects, at least one of the two first layers (71a, 71b) may be thinner than an optimum thickness that would minimize reflection at the predetermined wavelength. For instance, the at least one of the two first layers (71a, 71b) may be thinner than the optimum thickness by at least 50 nm, or 75 nm, or 100 nm. In other aspects, each of the at least two first layers (71a, 71b) may be thinner than an optimum thickness that would minimize reflection at the predetermined wavelength. For instance, each of the at least two first layers (71a, 71b) may be thinner than the optimum thickness by at least 50 nm, or 75 nm, or 100 nm.

In some instances, an average thickness of the second high index layer (71b) may be less than about 180 nm. In other instances, an average thickness of the second high index layer (71b) may be less than about 160 nm. In some other instances, an average thickness of the second high index layer (71b) may be less than about 140 nm, or less than about 130 nm, or less than about 120 nm, or less than about 110 nm, or less than about 100 nm, or less than about 90 nm.

In some embodiments, heating the optical ferrule (200) at a temperature of about 85 degrees centigrade for at least five hours, or for at least ten hours, results in no, or very little, damage to the multilayer anti-reflection film (70). In other embodiments, heating the optical ferrule at a temperature of about 90 degrees centigrade for at least five hours, or for at least ten hours, results in no, or very little, damage to the multilayer anti-reflection film (70).

Figure 10:
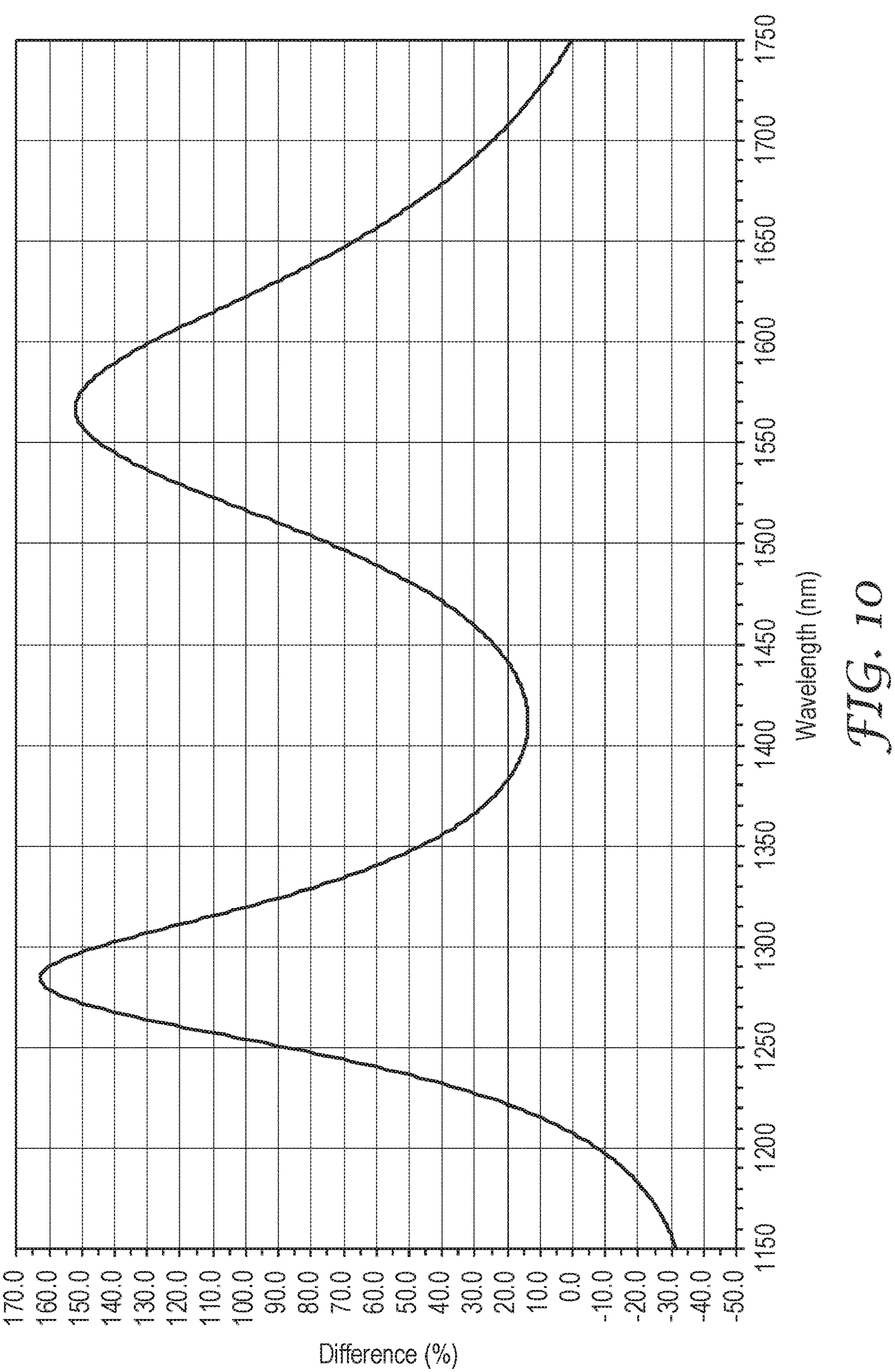
FIG. 10 graphically shows the difference in the optical reflectance of non-optimized and optimized multilayer anti-reflection film.

FIG. 9 graphically illustrates the optical reflectance of both optimized and non-optimized multilayer anti-reflection (AR) films over a predetermined wavelength range (80). FIG. 10 graphically illustrates the reflection difference (%) of a non-optimized AR film compared to an optimized AR film. TABLE 1 shown below provides the optical reflectance (%) in tabulated form for four layer TiO2/SiO2 optimized and non-optimized anti-reflection films and the reflection difference (%) that are graphically represented in FIGS. 9 & 10.

TABLE 1

| Wavelength (nm) | Reflection (%) Optimized AR film | Reflection (%) Non-optimized AR film | Reflection difference (%) |
|---|---|---|---|
| 1150 | 1.750169 | 1.19912 | −31.49% |
| 1200 | 0.558554 | 0.516318 | −7.56% |
| 1250 | 0.139752 | 0.262605 | 87.91% |
| 1300 | 0.076988 | 0.188622 | 145.00% |
| 1350 | 0.117564 | 0.17199 | 46.29% |
| 1400 | 0.146217 | 0.167642 | 14.65% |

TABLE 1-continued

| Wavelength (nm) | Reflection (%) Optimized AR film | Reflection (%) Non-optimized AR film | Reflection difference (%) |
|---|---|---|---|
| 1450 | 0.136051 | 0.169001 | 24.22% |
| 1500 | 0.1063 | 0.185432 | 74.44% |
| 1550 | 0.093947 | 0.230016 | 144.84% |
| 1600 | 0.137362 | 0.314411 | 128.89% |
| 1650 | 0.266328 | 0.444511 | 66.90% |
| 1700 | 0.499325 | 0.621975 | 24.56% |
| 1750 | 0.841009 | 0.843222 | 0.26% |

In some aspects, at the predetermined incident angle (0) and across the predetermined wavelength range (80), the non-optimized multilayer anti-reflection film (70) including titanium oxide and silicon dioxide layers may have an average optical reflectance (R1) and the optimized multilayer anti-reflection film including titanium oxide and silicon dioxide layers and having a same number of layers as the non-optimized multilayer anti-reflection film (70) may have an average minimum reflectance (Rmin). In some embodiments, the average optical reflectance (R1) of the non-optimized multilayer anti-reflection film (70) may be greater by at least about 20% than the average minimum reflectance (Rmin) achievable in the optimized multilayer anti-reflection film. In other aspects, the non-optimized multilayer anti-reflection film (70) including titanium oxide and silicon dioxide layers may have an average optical reflectance (R1) that may be greater by at least about 30%, or about 40%, or about 50%, or about 60%, or about 70% than an average minimum reflectance (Rmin) achievable in an optimized multilayer anti-reflection film that has a same number of layers as the non-optimized multilayer anti-reflection film (70) and includes titanium oxide and silicon dioxide.

In some embodiments, the non-optimized multilayer anti-reflection film (70) may have an average thickness that is less by at least about 10%, or at least 15%, or at least 20%, or at least 25% than an average thickness of the optimized multilayer anti-reflection film.

In some cases, the polymeric ferrule bodies (20) may be made of thermoplastic polymers, such as cyclo olefin polymer, for instance. In some embodiments, the optical reflection at cyclo olefin polymer-to-air interface can be significantly reduced to less than 0.5% (<0.025 dB reflection loss) with the non-optimized multilayer anti-reflection film (70) described in one or more embodiments disclosed herein. The non-optimized anti-reflection film (70) may include alternating high and low refractive index layers, with the low index layers including $SiO_2$, with a refractive index around 1.44, and the high index layers including $TiO_2$, with refractive index around 2.2. SiO2 is also a hard oxide which can serve as scratch resistant surface protecting layer. $TiO_2$ adheres well to cyclo olefin polymer to serve as an interfacial bonding layer.

What is claimed:

1. An optical ferrule configured to transmit and propagate therein light having a wavelength in a predetermined wavelength range extending from about 1250 nm to about 1650 nm, the optical ferrule comprising:

a unitary polymeric ferrule body comprising:

one or more fiber alignment features for receiving one or more optical fibers;

an input side;

a redirecting side; and an output side window; and a multilayer anti-reflection film disposed on the output side window and comprising a plurality of alternating higher and lower index layers, each higher index layer comprising titanium oxide, each lower index layer comprising silicon dioxide, with a first higher index layer adjacent the polymeric ferrule body, such that when an optical fiber is received by a fiber alignment feature in the one or more fiber alignment features, a central light ray emitted by the optical fiber at the predetermined wavelength enters the polymeric ferrule body through the input side, is redirected by the redirecting side, and exits the polymeric ferrule body through the output side window and the multilayer anti-reflection film after being incident on the multilayer anti-reflection film at a predetermined incident angle, wherein, at the predetermined incident angle and across 1250-1650 nm, an average optical reflectance Ravg of the multilayer anti-reflection film is at least 1.20 times a minimum average reflectance Rmin obtained for a multilayer anti-reflection film having the same layer count and materials, by varying layer thicknesses to minimize the average reflectance across 1250-1650 nm at the predetermined incident angle, and at least one higher-index layer has a physical thickness at least 50 nm less than the thickness of that layer in the multilayer anti-reflection film that yields Rmin.

2. The optical ferrule of claim 1, wherein heating the optical ferrule at a temperature of about 85 degrees centigrade for at least five hours results in no, or very little, damage to the multilayer anti-reflection film.

3. The optical ferrule of claim 1, wherein heating the optical ferrule at a temperature of about 90 degrees centigrade for at least five hours results in no, or very little, damage to the multilayer anti-reflection film.

4. The optical ferrule of claim 1, wherein an average thickness of the multilayer anti-reflection film is at least about 10% less than an average thickness of the multilayer anti-reflection film that yields Rmin.

5. The optical ferrule of claim 1, wherein the multilayer anti-reflection film comprises first and second titanium oxide layers, the first titanium oxide layer disposed between the second titanium oxide layer and the ferrule body, and an average thickness of the second titanium oxide layer is less than about 180 nm.

6. The optical ferrule of claim 1, wherein the multilayer anti-reflection film comprises only two higher-index layers and only two lower-index layers, each higher-index layer consisting essentially of titanium oxide (TiO2) and each lower-index layer consisting essentially of silicon dioxide (SiO2), the layers arranged as arranged TiO2/SiO2/TiO2/SiO2.

7. An optical ferrule comprising:

a polymeric ferrule body comprising a fiber alignment feature for receiving an optical fiber, a redirecting side for redirecting light, and an output side window for exiting light therethrough; and a multilayer anti-reflection film disposed on the output side window and comprising at least two first layers comprising titanium oxide and at least two second layers comprising silicon dioxide, wherein:

the optical ferrule is configured to transmit and propagate therein light having a predetermined wavelength within 1250 nm to 1650 nm;

at least one of the two first layers has a physical thickness at least 50 nm less than the thickness of that layer in a multilayer anti-reflection film having the same layer count and materials that minimizes average reflectance across 1250-1650 nm at the predetermined incident angle; and heating the optical ferrule at a temperature of about 85 degrees centigrade for at least 5 hours results in no, or very little, damage to the multilayer anti-reflection film.

8. The optical ferrule of claim 7, wherein each of the at least two first layers has a physical thickness less than the thickness of that layer in a multilayer anti-reflection film having the same layer count and materials that minimizes average reflectance across 1250-1650 nm at the predetermined incident angle.

9. The optical ferrule of claim 7, wherein the at least one of the two first layers is thinner than the thickness in the film that minimizes average reflectance across 1250-1650 nm at the predetermined incident angle by at least 50 nm.

10. An optical ferrule comprising:

a polymeric ferrule body comprising a fiber alignment feature for receiving an optical fiber, a redirecting side for redirecting light, and an output side window for exiting light therethrough; and a multilayer anti-reflection film disposed on the output side window and comprising first and second high index layers comprising titanium oxide and at least two low index layers comprising silicon dioxide, wherein the first high index layer is disposed between the ferrule body and the second high index layer, and wherein an average thickness of the second high index layer is less than about 140 nm.

* * * * *